United States Patent [19]

Lovgren et al.

[11] Patent Number: 4,578,722
[45] Date of Patent: Mar. 25, 1986

[54] METHOD FOR CHECKING DISK IDENTITY IN A FLEXIBLE DISK RECORDER

[75] Inventors: Jeffrey L. Lovgren, Rochester, Minn.; William B. Plummer, Boulder, Colo.

[73] Assignee: International Business Machines Corporation, Armonk, N.Y.

[21] Appl. No.: 452,548

[22] Filed: Dec. 23, 1982

[51] Int. Cl.$^4$ .............................. G11B 5/02; G11B 5/09
[52] U.S. Cl. .................................... 360/60; 360/135; 360/137
[58] Field of Search ............... 360/60, 133, 72.2, 135, 360/137, 48

[56] References Cited

U.S. PATENT DOCUMENTS

| 3,335,410 | 8/1967 | Baskin et al. | 360/60 X |
| 3,340,539 | 9/1967 | Sims, Jr. | 360/60 X |
| 4,241,420 | 12/1980 | Fish et al. | 364/900 |
| 4,297,734 | 10/1981 | Laishley et al. | 360/78 |
| 4,393,445 | 7/1983 | Milligan et al. | 360/72.2 X |

FOREIGN PATENT DOCUMENTS

| 1499607 | 11/1971 | Fed. Rep. of Germany. | |
| 354122 | 12/1979 | Fed. Rep. of Germany. | |
| 54-58012 | 5/1979 | Japan | 360/60 |
| 54-146618 | 11/1979 | Japan | 360/60 |
| 55-123750 | 9/1980 | Japan | 360/60 |
| 1446255 | 8/1976 | United Kingdom. | |
| 2112971 | 7/1983 | United Kingdom | 360/60 |

OTHER PUBLICATIONS

IBM-TDB vol. 21, No. 2, Jul. 1978-Gupugé, Preventing Unauthorized Access to Diskette-Loaded Microcode.

Primary Examiner—Raymond F. Cardillo
Assistant Examiner—Alyssa H. Bowler
Attorney, Agent, or Firm—Knearl Homer L.; Carl M. Wright

[57] ABSTRACT

A diskette identifying code is written in each sector on a flexible disk used in a flexible disk recorder. The diskette identifying code can be read from any track on the flexible disk and used to log the occurrence of insertion or removal of the diskette at the flexible disk recorder. Also, the diskette identifying code can be read from any accessed track prior to a write operation on that track in order to verify that the diskette has not been changed by the operator since the last access to the flexible disk.

7 Claims, 5 Drawing Figures

DISKETTE INSERT ROUTINE

DISKETTE WRITE ROUTINE

DISKETTE REMOVE ROUTINE

METHOD FOR CHECKING DISK IDENTITY IN A FLEXIBLE DISK RECORDER

FIELD OF THE INVENTION

This invention relates to flexible disk recorders that read and write information on interchangeable flexible magnetic disks mounted in an envelope or cartridge. More particularly, the invention relates to verifying that a disk cartridge in a disk recorder or drive has not been exchanged with another cartridge between successive accesses by a using system.

BACKGROUND OF THE INVENTION

In flexible disk recorders with interchangeable cartridges sometimes referred to as diskettes, it is necessary to verify that the diskette or cartridge has not been changed by an operator between successive access operations by the using system. In the past, the recorders had a mechanical or electrical sensor that detected the removal of the cartridge from the recorder. The sensor sent an interrupt to the using system if a diskette was removed. Accordingly if an operator exchanged disk cartridges in the middle of an operation, the interrupt would prevent the using system from writing onto an incorrect disk. Writing on an incorrect disk is a serious problem because data overwritten on the incorrect disk is lost.

One difficulty with using mechanical or electrical sensors to detect a cartridge change is that the sensors and their associated electronics are expensive. It is desirable to eliminate this expense when designing a low cost flexible disk recorder.

One technique, to prevent overwriting data on an incorrect disk without using electrical or mechanical sensors, is to do a Volume Identifier (VOLID) check at the beginning of each access to the disk. A VOLID is recorded by a command from the using system on one track of the disk, usually track zero. During each access to the disk, the using system instructs the recorder to move the read/write head to track zero and read the VOLID. If the using system verifies that the VOLID is the expected VOLID, the read or write operation proceeds. If the VOLID read is different from that expected, the system is interrupted and an error is indicated. The difficulty with doing the VOLID check during each access is that the access time to reach a desired data sector is too long. Each access requires the recorder to move the head to track zero to read the VOLID before the head is moved to the track containing the sectors with the desired dataset.

SUMMARY OF THE INVENTION

This invention has solved the above problems by having a Disk Identifier (DID) written at the beginning of each data sector on the disk. Each time the using system causes the recorder to access a data sector, the read/write head goes straight to the track containing the desired data sector. Before the using system issues a write command, the recorder is instructed to read the DID at the front of the data sector. If the read DID is the same as the expected DID, the user instructs the recorder to proceed with the write operation. The DID expected is stored during the first read operation after a diskette is loaded into the recorder. Thereafter, during each successive access, the using system instructs the recorder to read any DID at the track of the addressed data sector. The using system compares the DID just read to the DID previously stored. If they compare equal, the write operation proceeds. If they are not identical, the using system blocks the recorder from writing and indicates an error to the operator.

The DID may be permanently written at each data sector during the manufacture of the diskette. In addition to containing a diskette serial number, the DID could contain manufacture data such as date, location of manufacture, batch number, test station number, etc. Thus, the DID could be used subsequently to track faults in the manufacturing process if the diskette failed.

One advantage of this invention is the recorder does not have to have mechanical or electrical sensors to detect that the operator has changed the cartridge or diskette. In addition, the access time is not lengthened even though the system verifies the disk identity before it allows a write operation to proceed.

BRIEF DESCRIPTION OF DRAWINGS

The invention is described in detail below with reference to drawings, illustrating specific embodiments of the invention, in which.

DETAILED DESCRIPTION

Figure 1:
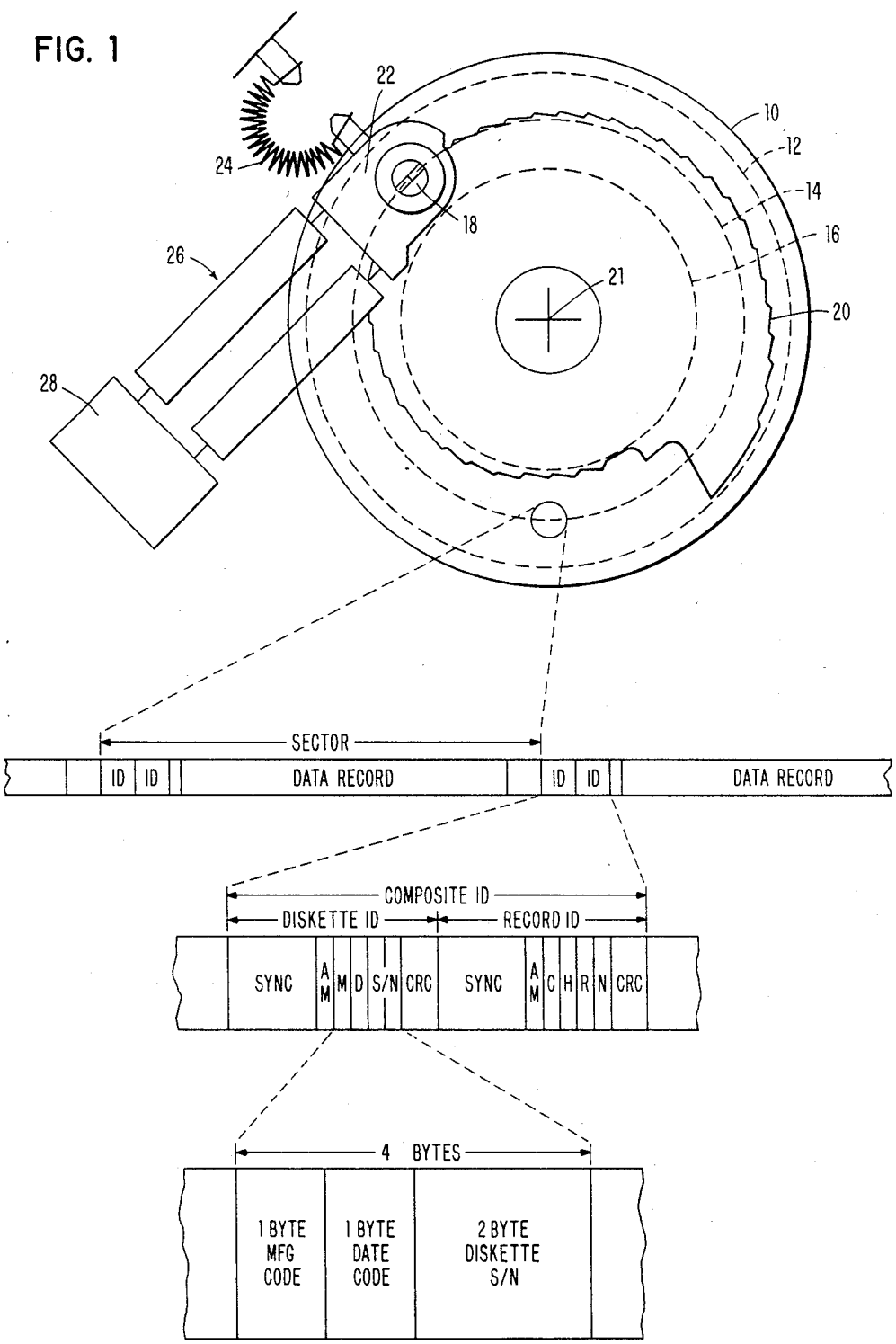
FIG. 1 is a schematic representation of a flexible disk recorder showing the format of a data sector in a recorded track.

In FIG. 1, a flexible recording disk 10 (shown as if it were transparent) contains recorded tracks indicated by dashed lines 12, 14 and 16. Each of these concentric tracks is accessed by moving recording head 18 substantially along a radial line of the recording disk 10.

Recording head 18 is indexed to each track by cam 20. Cam 20 rotates about the same axis as the axis of rotation of flexible disk 10. The circumference of cam 20 is faceted. The cam engages a cam follower positioned directly under head 18 on the head carriage 22. Carriage 22 is biased towards the axis of rotation 21 by spring 24. Carriage 22 is a part of an articulated arm 26 that is fastened at mounting block 28.

As cam 20 is indexed to bring different facets of the cam to the cam follower on carriage 22, head 18 is moved to a different track on the flexible disk 10. In the position shown, head 18 is accessing track 14 which is a center track. Track 12 would be the outermost track while track 16 is the innermost track. Any number of flexible disk recording systems might be used. The system shown schematically in FIG. 1 is included here for background.

The recording format of a sector in a track in FIG. 1 is shown in detail. The recording format is new in that it contains the diskette identifier (DID) which is used in the present invention. The DID is in each sector of each track recorded on disk 10. While the disk could be formatted with this new disk format by any disk drive, it is preferred that the disk be formatted at the time of manufacture.

Each sector begins with two identifiers. The identifiers are followed by the data record. There is an unrecorded gap between the end of the last identifier and the beginning of the data record and there is an additional unrecorded gap at the end of the data record before the beginning of the next data sector.

The content of each of the identifiers is also shown in FIG. 1. The first ID is the diskette identifier while the second ID is the record identifier. Each identifier begins with a sync burst. The sync burst is used to synchronize the phase-lock loop in the read channel. The sync burst is followed by a one byte address mark which, in turn, is followed by the identifier bytes. Finally, a cyclic redundancy code is at the end of each ID for the purpose of checking the ID for errors.

The record ID bytes, denoted as C, H, R and N in FIG. 1, identify the data record in the sector. The C byte is the cylinder number; the H byte is the head number; the R byte is the record number; and the N byte is the length of the record. This format for the record ID is well known.

The diskette ID bytes preferably include a manufacturing code, a date code and two bytes for a serial number. The M byte is the manufacturer's code and could include a manufacturing location as well as a manufacturer's identity. The D byte is the date code. A single byte might cover as much as five years if the date is coded by weeks. Finally, the serial number byte could be randomly assigned, chronologically assigned or could contain additional information such as test or inspection number. In any event, the diskette ID should be unique with each flexible disk manufactured and would be repeated at each data sector on the flexible disk.

Figure 3:
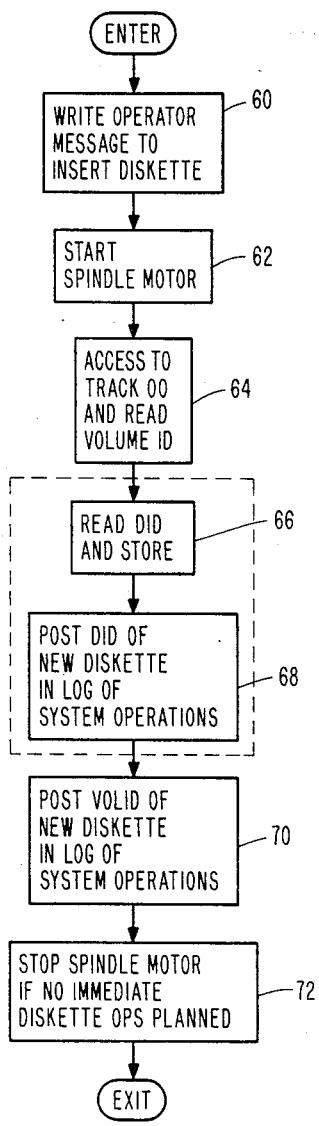
FIGS. 3, 4 and 5 show the preferred embodiment of the invention implemented in the routines for diskette insert, diskette write and diskette remove.
Figure 4:
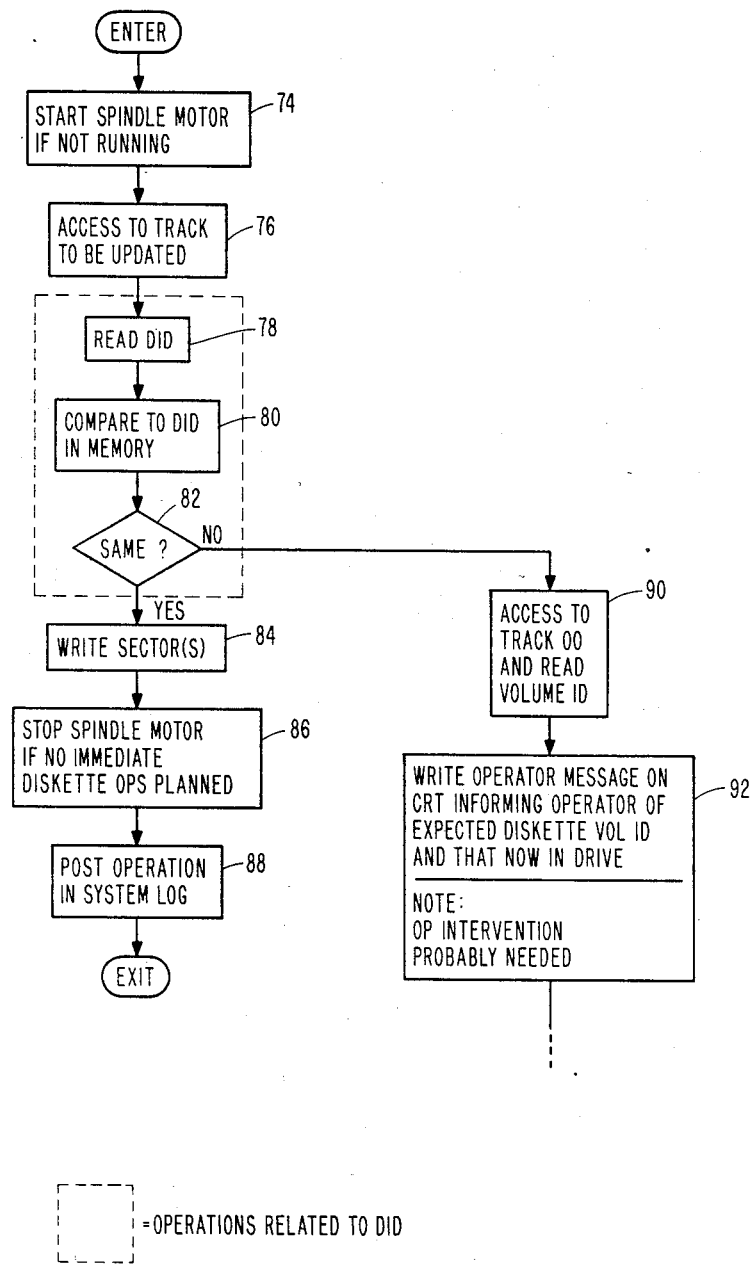
Figure 5:
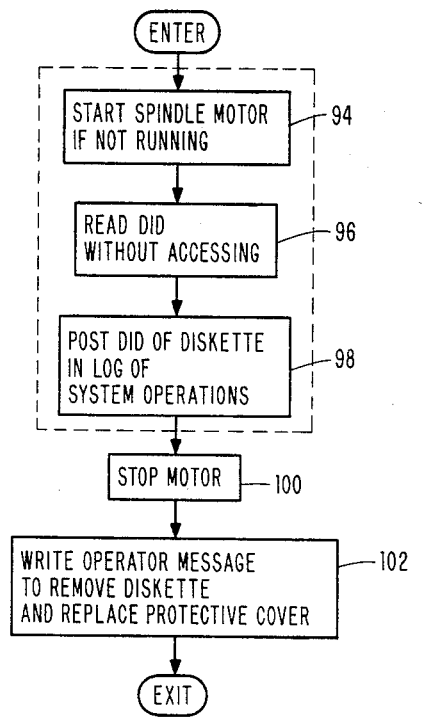

Before proceeding to the method for using the diskette ID described in FIGS. 3, 4 and 5, background on how a flexible disk drive is typically attached to a using system may be helpful in understanding the invention. However, if the reader is familiar with such systems, the reader may wish to proceed directly to the section entitled "Diskette ID Routines."

Adapter

Figure 2:
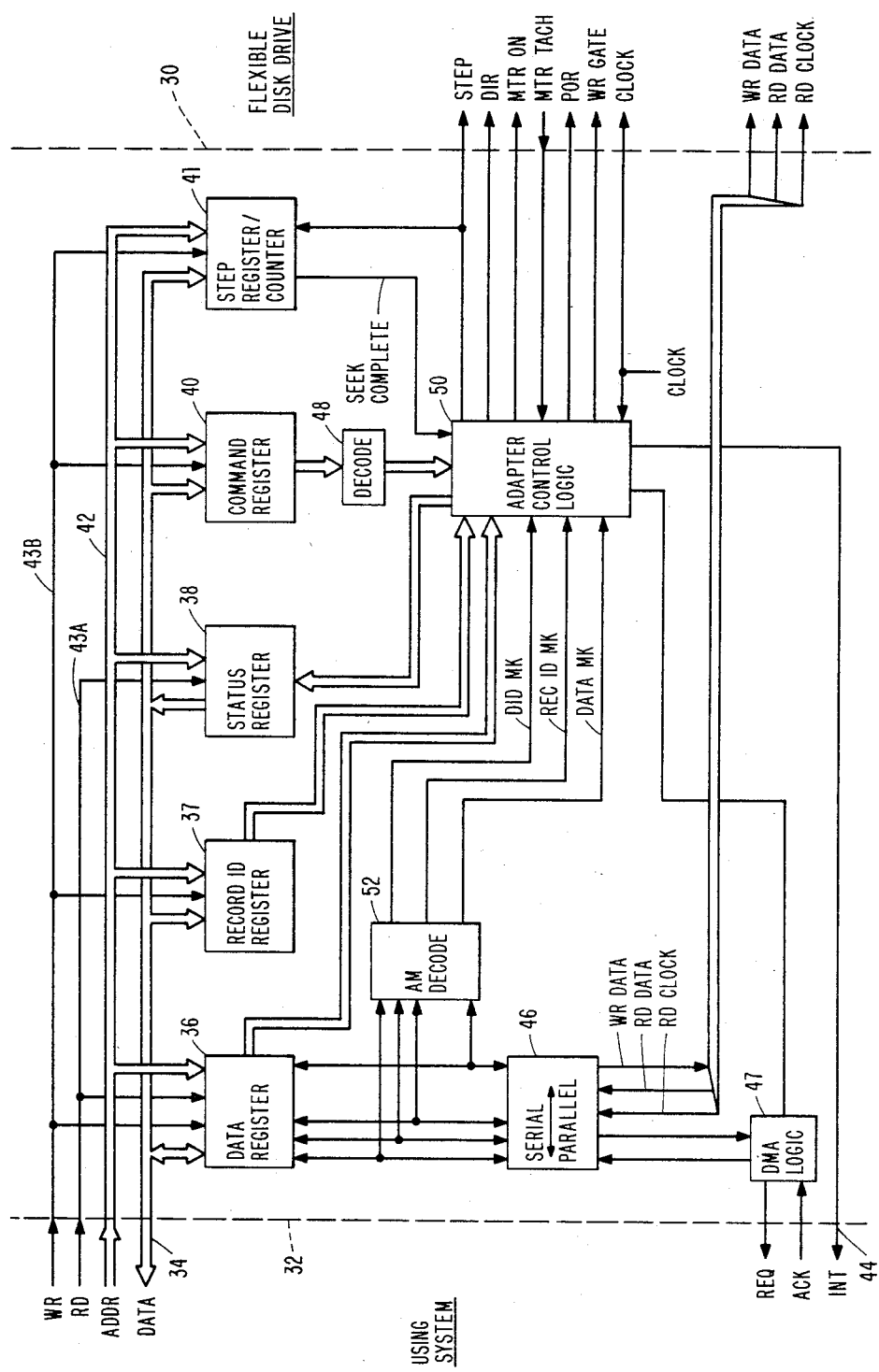
FIG. 2 shows typical architecture for an adapter between a using system and a flexible disk recorder.

In FIG. 2, the architecture of a typical adapter between a using system in a flexible disk drive (or diskette drive) is shown. The interface between the diskette drive and the adapter is represented by the dashed line 30. There are ten signal lines across interface 30. The interface between the using system and the adapter is represented by dashed line 32. The signal lines shown across interface 32, are those signal lines helpful in understanding the invention; other lines across the interface are not shown.

Data bus 34 carries data to and from data register 36, record ID to the record ID register 37, status information from status register 38, command information to command register 40 and recording head indexing information to step register/counter 41. Address bus 42 controls which of the registers 36, 37, 38, 40 or 41 is being addressed by the using system. Read and write control lines 43A and 43B from the using system control the reading and writing of information into or out of the registers.

The interrupt system signal over line 44 is an interrupt flag to the using system. It indicates that an operation has been completed by the adapter or the diskette drive.

Data register 36 in the adapter is a buffer register for read data from the drive or for write data to the drive. The read data signal from the drive is serial in form and is converted to an 8-bit word by serial/parallel converter 46. The clock signal used by the converter 46 to do the conversion is the read clock signal derived from the recorded data signal by a phase-lock loop (not shown) in the diskette drive.

Record ID register 37 stores the record ID of the data field to be accessed. Its contents will be compared to record ID bytes read from the flexible disk.

Status register 38 contains eight status bits. Status bit 1 (SB1), for example, is a flag back to the using system that the present device is the diskette drive that has generated the interrupt.

Command register 40 buffers commands from the using system and decoder 28 decodes the commands for use by the adapter and the diskette drive. Some examples of commands are seek, write record and reset interrupt.

The seek command is decoded by decoder 48 to indicate the direction the recording head is to be moved and also to enable a step clock in the control logic 50 that generates the actual step pulses for the recording head index mechanism in the drive. Logic 50 also generates the direction signal passed from the adapter to the drive to control the direction of motion of the recording head. The step pulses from logic 50 are also used within the adapter to decrement the step count loaded into the step register/counter 41 by the using system.

The seek command is also decoded in decoder 48 and used by logic 50 to generate a motor on (MTR ON) signal. The MTR ON signal is used to turn the spindle motor (disk motor) on and off in the drive. To prevent the recording head from scratching the recording disk, the MTR ON signal always goes active with the seek signal. Accordingly, the recording disk will always be moving when the recording head is moved across the disk.

The step register/counter 41 buffers the step count sent from the using system to the recording head indexing mechanism in the drive. For each access operation, the using system sends a count to register/counter 41 equal to the number of steps the recording head is to be moved. After this count is read into register 41, the using system sends the seek command to command register 40 to start the access operation.

As described above, the seek command, when decoded, causes a step clock to emit the step pulses passed across the interface to the drive. Each step pulse also decrements the step count in register/counter 41. When the step count in register 41 reaches zero, the register emits the seek complete signal that inhibits the step clock and sets the interrupt system signal in logic 50. The interrupt system signal coming up on line 44 signals the using system that the adapter has finished the seek operation and the recording head is at the desired track.

When the diskette drive is reading information from a track, the read data signal is passed to the serial/parallel converter 46 in the adapter. When converter 46 has an 8-bit data word ready for register 36, it passes it to the register. At the same time, the DMA (Direct Memory Access) logic 47 in the adapter sends a request (REQ) signal across interface 32 to the DMA controller in the using system. When the DMA controller can steal a cycle from the processor in the using system, it reads the eight-bit word in data register 36 into the using system. Then the DMA controller sends an acknowledge (ACK) signal back to the DMA logic 47 so that the logic will enable converter 46 to load the next byte into register 36.

If the system is writing data rather than reading data at a selected sector, the using system sends the data byte to data register 36 and a write data command to command register 40. The byte of data is converted into a serial 8-bit stream by serial/parallel converter 46 and passed out on the write data line to the flexible disk drive. This occurs only after the write data command has been decoded by decoder 48 and enables the adapter control logic to generate the write gate signal. Prior to a write operation, the system will first check that the diskette has not been exchanged with another diskette. This is done by issuing a read any DID command to the commond register 40. Decoder 48 prepares the adapter control logic 50 to wait for a DID address mark signal from AM decoder 52. When this DID address mark appears at the output of converter 46, the address mark decode 52 decodes it as a DID mark and signals the adapter control logic 50.

When the first byte of the DID following the address mark is received at the parallel converter 46 and loaded into data register 36, the adapter control logic activates the DMA logic 47 to send a request to the using system. The DMA controller in the using system, then working with the DMA logic, causes the successive bytes of the DID to be loaded into data register 36 and read into the using system. The using system compares the DID bytes to the DID from a previous read operation. If the DID's do not compare, then the diskette has been changed since the last operation, and the write operation is aborted. If the DID's compare equal, the operation continues.

After the diskette identifier has been verified by the using system, the using system would then issue a write data command to the command register 40. The decode 48 prepares the adapter control logic 50 to wait for a record ID address mark signal from AM decode 52. Decode 52 signals the adapter control logic 50 that a record ID address mark has been decoded. The adapter control logic then compares the record ID from register 37 to the record ID bytes read by the diskette drive. If all of the bytes of the record ID compare equal with the bytes in the record ID register 37, and the using system knows the correct sector has been accessed, the using system then sends write data to the adapter. The adapter controls the writing of data into the sector.

Diskette Identifier Routines

The three routines utilized by a using system for checking disk identity in accordance with the present invention, would include diskette insert routine (FIG. 3), diskette write routine (FIG. 4) and diskette remove routine (FIG. 5). Portions of these routines relevant to the diskette identity check have been enclosed by dashed lines in FIGS. 3, 4 and 5.

In the diskette insert routine shown in FIG. 3, the using system begins by writing a message to the operator at step 60 requesting the operator to insert the diskette into the flexible disk drive. The message would typically be displayed on a cathode ray tube screen or alternatively would be printed out at a printer. Next, at steps 62 and 64, the using system would cause the flexible disk drive to index the recording head to the track on the disk containing the volume ID (VOLID). Usually this is track zero.

Although the system has accessed track zero to read the DID, this is a matter of convenience. The DID could be read from any track. However, the system at the time of first access needs to read the VOLID, which is at track zero. Therefore, the system reads the DID at the same time as it is retrieving the VOLID.

As discussed earlier under the heading "Adapter," the using system accomplishes an access by sending a step count to step register counter 41 followed by seek command to command register 40. This causes the spindle motor to start as indicated by step 62 in FIG. 3, and causes the recording head in the flexible disk drive to be moved to track zero as called for in step 64.

Now the using system is ready to read the diskette ID (DID) for the first time. At step 66, the using system issues the necessary commands to read the DID and thereafter store it in the using system. The DID would also be posted by the using system in step 68 in the log of system operations. Posting the DID in the log may be useful subsequently for diagnostic operations on the system or in detecting a failing diskette.

After the DID has been read and stored and also optionally logged, the using system posts the volume ID read during step 64 in the log of system operations. Thereafter the insert routine is completed by stopping the disk spindle motor at step 72 in the routine if no further diskette operations are required.

In FIG. 4, the diskette identity check first takes place. Before writing on the flexible disk, the using system needs to check that the disk it is about to write on is the same disk that was inserted during the diskette insert routine that was in the drive during the last access at that drive. Otherwise, if the diskettes have been switched by the operator, the using system could destroy valuable data by overwriting onto a wrong disk. The diskette write routine begins with steps 74 and 76 by use of a seek command which causes the disk spindle motor to start and the recording head to be indexed to access the track where the record is to be updated. Once the recording head is at the track, then the using system gives the command at step 78 to read the DID, followed by step 80 to compare the DID read to the DID stored in memory during the diskette insert routine. If the DID just read is identical to that previously stored in memory, then decision block 82 allows the write routine to proceed at step 84 to write sectors.

With the diskette identity verified as the proper diskette, the using system proceeds to give the commands to write the sectors on the desired track. Note that it is not necessary for the system to go to track zero to read a volume ID. The system has been able to identify from the desired track that it does have the correct diskette and can proceed immediately to write the desired sectors in that track.

After the sectors have been written, the write routine, at step 86, stops the spindle motor since no more diskette operations are required. The routine is completed by posting the operations just performed in the system log at step 88.

In the event the compare of the read DID to the stored DID did not match, then decision block 82 of the routine would cause a branch to step 90. In step 90, the using system would command the flexible disk drive to access to track zero and again read the volume ID. After the volume ID is read, the system would write a message to the operator at step 92 informing the operator of the volume ID now in the flexible disk drive, and the system would likely request some intervention by the operator, either to insert the correct diskette or confirm the write operation on the present diskette.

The DID might also be used in a diskette remove routine when desired to keep a log of system operation. The remove routine would commence by starting the spindle motor at step 94. Since the diskette ID is in each data sector, no accessing of the head is required. Any track that the head is on may be used to read the DID. Thus, in step 96, the using system issues the commands to read the DID. After the DID has been read, the system posts the DID into the log of system operations at step 98. With the reading operation complete, the using system stops the spindle motor at step 100, and at step 102 writes a message to the operator to remove the diskette and replace its protective cover.

While all of the routines in FIGS. 3, 4 and 5 have been described as being performed by a computer in the using system, it will be appreciated by one skilled in the art that disk identity routines might also be performed by a floppy disk controller. Such a controller is available from any NEC Microcomputers, Inc., as the model $\mu$PD765. Of course such a controller would have to be modified to contain an address mark decode to pick out the diskette identifier.

While we have illustrated and described the preferred embodiment of our invention, it is understood that we do not limit ourselves to the precise constructions herein disclosed and the right is reserved to all changes and modifications coming within the scope of the invention as defined in the appended claims.

What is claimed is:

1. Method for checking the identity of a recording disk which may be interchangeably loaded with other recording disks into a disk recording device, said method comprising the steps of:

reading a disk identifier from any data sector on the recording disk;

storing the disk identifier read from the recording disk;

accessing a track on the recording disk in preparation for performing an operation on the recording disk at the accessed track;

reading a disk identifier from the accessed track;

comparing the identifier read from the accessed track to the identifier previously stored;

proceeding with the operation on the recording disk if the identifier just read is the same as the stored identifier;

aborting the operation on the recording disk if the identifier just read is not the same as the stored identifier.

2. The method of claim 1 wherein said operation on the recording disk is a write operation.

3. The method of claim 2 wherein said proceeding step comprises the steps of:

accessing a data sector in the accessed data track;

writing data in the accessed data sector if the identifier just read is the same as the stored identifier.

4. The method of claim 3 wherein said recording disk includes a disk name prerecorded on a predetermined track and said aborting step comprises the steps of:

accessing the predetermined track containing the disk name;

reading the disk name; and writing an error message to the operator that includes the disk name.

5. Method for logging the indentity of a flexible disk that has been inserted into a flexible disk recorder, said flexible disk has recorded at each of its data sectors a disk identifying code, said method comprising the steps of:

initially reading the disk identifying code from any sector on the flexible disk;

storing the disk identifying code just read;

reading the disk identifying code from any sector on the disk prior to writing on the disk; comparing the disk identifying code just read to the disk identifying code previously stored; enabling the write operation if the code read and the stored code are the same; otherwise outputting an error message.

6. The method of claim 5 wherein said step of reading prior to writing comprises the steps of:

accessing a track in which the writing operation is to occur;

detecting an address mark of the disk identifying code in any data sector in the accessed track; and reading the disk identifying code following the address mark.

7. The method of claim 6 wherein said recording disk includes a prerecorded volume identifying code and said outputting step comprises the steps of:

accessing the volume identifying code on the recording disk;

reading the volume identifying code; and writing an error message to the operator including the volume identifying code.

* * * * *